(No Model.)
E. WYLDE.
INDICATOR MECHANISM FOR ELEVATORS.
No. 496,986. Patented May 9, 1893.
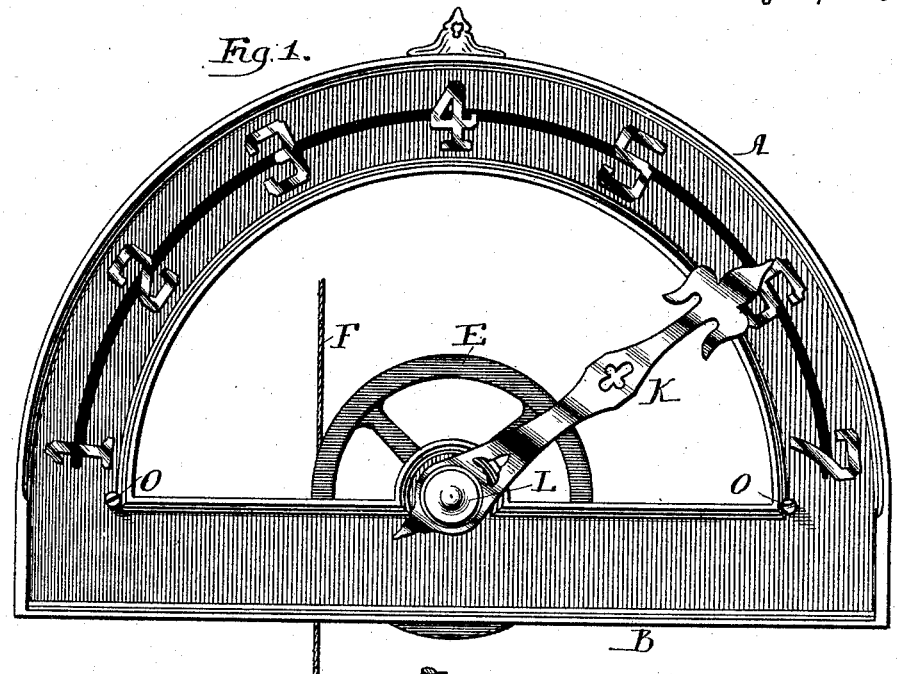
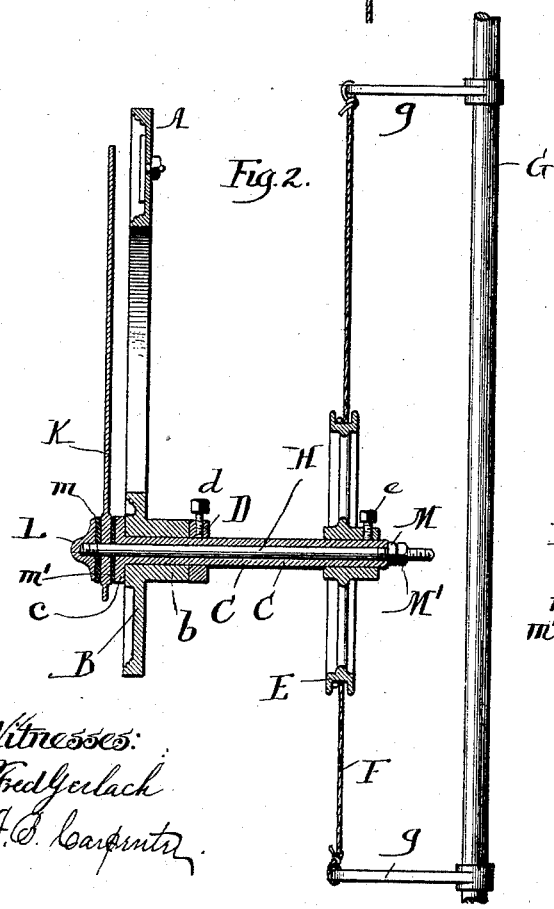
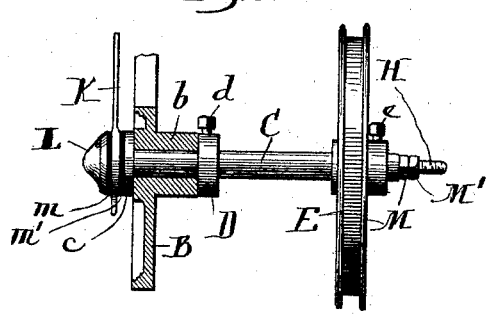
Witnesses:
Fred Gerlach
J. B. Carpenter
Inventor:
Edward Wylde
By Peirce & Fisher
Attorneys

UNITED STATES PATENT OFFICE.

EDWARD WYLDE, OF CHICAGO, ILLINOIS.

INDICATOR MECHANISM FOR ELEVATORS.

SPECIFICATION forming part of Letters Patent No. 496,986, dated May 9, 1893.

Application filed July 11, 1892. Serial No. 439,676. (No model.)

*To all whom it may concern:*

Be it known that I, EDWARD WYLDE, a citizen of the United States, residing at Chicago, in the county of Cook and State of Illinois, have invented certain new and useful Improvements in Indicator Mechanism for Elevators, of which I do declare the following to be a full, clear, and exact description, reference being had to the accompanying drawings, forming part of this specification.

In an application filed by me in the United States Patent Office under date of January 12, 1892, Serial No. 417,891, which said application was allowed February 13, 1892, I have described and claimed certain improvements in indicator mechanism for elevators designed to indicate to persons upon the several floors of the building the position of the elevator as it is ascending or descending within the hatchway or elevator shaft. In the construction set forth in said application, provision is made whereby the pointers of the various indices shall be caused to accurately indicate upon their plates or dials the position of the elevator and this accurate operation of the indicator pointers is accomplished in a measure by interposing a slip joint connection between the pointers and the indicator rod or other device whereby the operation of the pointers is effected. In the indicators set forth in said application, the particular construction of indices illustrated in the drawings forming part of such application comprises vertical index plates having numerals thereon, and vertically reciprocating pointers suitably operated from the indicator rod.

My present invention, like that set out in my above mentioned application, has for its object to secure the accurate correspondence between the indicator pointers and the numbers upon the plates or dials in connection with which these pointers are used, but my present invention has relation more particularly to that class of indicator mechanism in which pivoted or vibrating indicator pointers are employed in connection with curved or semi-circular index plates or dials. I do not wish therefore to be understood as claiming particularly in this application the feature of providing a slip-joint connection between an indicator pointer and the indicator rod by which movement is imparted to such pointer, as this subject-matter is embraced in my above mentioned application, but my present invention is designed to cover the feature of providing a slip-joint connection between a pivoted or vibrating indicator pointer and the indicator rod or other device by which movement is imparted to such pointer.

Figure 1 is a front view of an indicator mechanism embodying my invention. Fig. 2 is a view in central vertical section, and Fig. 3 is a view in side elevation.

I have deemed it necessary to illustrate in the accompanying drawings only one indicator pointer and one dial plate, and the mechanism for imparting movement to the indicator pointer from the indicator rod. It will be understood that any desired number of these indicator pointers and dial plates may be used.

A designates the index plate upon the face of which are placed suitable figures or numbers corresponding with the floors of the building in which the elevator is to be used. Across the base of this plate A extends a base bar or plate B that is preferably formed with an inwardly projecting hub $b$ wherein is journaled a hollow shaft C. The outer end of the hollow shaft C is expanded or flanged, as at $c$, and the expanded ends $c$ bear against the cross bar B and aid in holding the hollow shaft C in proper position. A collar D is fitted upon the hollow shaft C adjacent the inner end of the hub $b$, and together with the set screw $d$ serves to hold the hollow shaft C against longitudinal displacement. Upon the inner end of the hollow shaft C is mounted a pulley E, the pulley being keyed to the hollow shaft C preferably by a set screw $c$. Around this pulley E passes a cord or cable F that is suitably connected as for example by arms $g$ with the indicator rod G so that as the indicator rod G is moved up and down a rotary movement will be imparted to the pulley E, and through the medium of this pulley E to the hollow shaft C. Through the sleeve C passes the clamp rod H, the outer end of this clamp rod passing through the indicator pointer K and entering a threaded seat in a retaining cap L.

Between the indicator pointer K and the cap L is interposed a friction washer or plate m of raw-hide, leather or the like, and so also between the inner face of the indicator pointer K, and the expanded end c of the shaft C is placed a similar washer or friction plate m'. The inner end of the clamp rod H is threaded to receive the nut M and by tightening this nut M, the cap L can be caused to bind as tightly as desired, the indicator pointer K between the friction plates or washers m and m'. It is this binding or clamping of the indicator pointer between the friction plates or washers m and m' which causes the indicator pointer K to receive a pivotal or vibratory movement from the shaft C, since it is plain that the clamp rod H passes loosely through the perforated end of the pointer K, and of itself does not impart movement thereto. A supplemental or locking nut M may also be employed to prevent the slipping of the nut M and consequent loosening of the parts.

From the face of the index plate A project suitable stops O which extend into the path of travel of the indicator pointer K at the points of its extreme movement, and consequently serve to arrest the downward movement of the indicator pointer below such stops.

From the foregoing description the operation of my improved mechanism will be seen to be as follows: Movement will be imparted to the indicator rod G by any convenient mechanism which shall cause such rod to move in correspondence with the movement of the elevator such for example as the mechanism set out in my hereinbefore mentioned application, and this movement of the indicator rod will be transmitted by the cord F to the pulley E around which such cord passes. As the pulley E is thus moved it will impart a corresponding movement to the sleeve C, and as the indicator pointer K is connected to such sleeve by means of the cap L, the rod H, and the friction plates or washers m and m', it is manifest that a like movement will be given to the indicator pointer. Inasmuch, however, as the indicator pointer is connected to the shaft C by the friction plate m m', the cap L and the rod H, and inasmuch as a slip-joint or yielding connection between the indicator pointer and the sleeve C is thus provided, it is manifest that when the indicator pointer contacts with either of the stops O about the extremes of its movement across the dial plate A, the further movement of such pointer in downward direction will be arrested and the pointer will be brought in exact alignment with the extreme figures or numbers upon the index plate. Hence if for any reason an unintentional variation has occurred in the length of the indicator working cable, or other device whereby motion is imparted to the indicator rod G, which would tend to cause the indicator pointer to accurately register with the numbers upon the index plate, then when the indicator pointer K has reached the extreme of its movement and has come into contact with either of the stops O, the further movement of the indicator pointer will be arrested, until the elevator car has reached the end of its travel, at which time obviously the indicator pointer will exactly indicate the extreme position of the elevator car. Plainly therefore as often as the indicator pointer contacts with the stops upon the index plate any variation of the pointer from its proper position with respect to the index numbers will be corrected.

I do not wish my invention to be understood as restricted to the precise details of construction above set out since these details may be varied without departing from the scope of my invention. Thus for example, other stops differing somewhat from the stops O may be employed for arresting the movement of the pointer and it is not necessary that a stop shall be employed at each end of the travel of the pointer. So also the slip joint connection may be interposed at other points between the indicator pointer and the indicator rod, so long as this slip joint is so located that it will enable the indicator pointer to be arrested at the extreme of its movement to effect the desired correspondence with the numbers upon the indicator dial plate. So, also, it is manifest that instead of an indicator rod G any other convenient mechanism may be employed for imparting movement to the pivoted indicator pointer.

Having thus described my invention, what I claim as new, and desire to secure by Letters Patent, is—

1. An indicator mechanism for elevators comprising the combination with a suitable device such for example as an indicator rod, of an index plate, a pivoted or vibratory pointer, a suitable slip-joint connection between said pointer and the indicator rod, and a suitable stop for arresting the indicator pointer, substantially as described.

2. An indicator mechanism for elevators comprising the combination with a suitable device such for example as an indicator rod, of an index plate, a pivoted or vibratory indicator pointer, a shaft for imparting movement to said pointer, and a slip joint connection between said shaft and said pointer, and a suitable stop or stops for arresting the movement of said pointer, substantially as described.

3. An indicator mechanism for elevators comprising the combination with a suitable device such for example as an indicator rod, of an index plate, a pivoted or vibratory indicator pointer, a hollow shaft for imparting movement to said pointer, a clamp rod passing through said shaft, and a cap and friction washers for connecting said indicator pointer to the hollow shaft, substantially as described.

4. An indicator mechanism for elevators, comprising the combination with a suitable device, such for example as an indicator rod, of an index plate, an indicator pointer K, a hollow shaft C, a clamp rod H passing through said hollow shaft, a cap L connected to said rod H, friction washers $m$ and $m'$ at the sides of said indicator pointer, a nut M, a suitable pulley E upon the shaft C, and a cord for imparting rotary movement to said pulley from the indicator rod, substantially as described.

EDWARD WYLDE.

Witnesses:
I. B. CARPENTER,
FRED GERLACH.